United States Patent [19]
Wang

[11] Patent Number: 4,905,946
[45] Date of Patent: Mar. 6, 1990

[54] ADJUSTABLE LEG ASSEMBLY

[76] Inventor: Shih Wang Lai, No. 654, Ta-Ya Road, Lai-Chou Li, North District, Taichung, Taiwan

[21] Appl. No.: 308,148

[22] Filed: Feb. 8, 1989

[51] Int. Cl.⁴ .......................................... F16M 11/38
[52] U.S. Cl. ................................... 248/170; 248/291; 403/92
[58] Field of Search ............... 248/170, 168, 171, 434, 248/439, 291, 293; 211/196; 108/125, 126, 127; 403/91, 92, 93, 95, 96, 98

[56] References Cited

U.S. PATENT DOCUMENTS

| 2,271,332 | 1/1942 | Ellington | 403/93 X |
|---|---|---|---|
| 2,353,513 | 7/1944 | Simmon | 248/168 X |
| 2,556,995 | 6/1951 | Coffing | 403/92 |
| 3,419,295 | 12/1968 | Small | 403/92 |
| 3,961,176 | 6/1976 | Gleason | 248/170 X |
| 4,593,879 | 6/1986 | Seely | 248/170 X |
| 4,770,559 | 9/1988 | Yoo | 403/93 |

FOREIGN PATENT DOCUMENTS 1560310  2/1969  France ................................ 248/168

Primary Examiner—J. Franklin Foss
Attorney, Agent, or Firm—Limbach, Limbach & Sutton

[57] ABSTRACT

A leg assembly comprises a tubular member and a plurality of radial leg members which are connected to the tubular member through a connector. The connector includes a sleeve member with radial lug members. Each leg member has a forked joint end connected pivotally to each lug member. Positioning pin holes are provided in the lug member and slide openings are provided in the joint ends. Positioning pins are respectively threaded through the positioning pin holes and the slide openings. The positioning pins can be locked at a desired position so as to immobilize the leg members.

10 Claims, 4 Drawing Sheets

ADJUSTABLE LEG ASSEMBLY

BACKGROUND OF THE INVENTION

This invention relates to a leg assembly for supporting an upright stand which carries an umbrella, a camera, a microphone, a lamp or the like.

Conventional leg assemblies for supporting umbrella are generally not adjustable and are not collapsible. Adjustable and collapsible leg assemblies currently available for supporting microphones, cameras, etc., are usually of complicated construction which requires additional brace members to form the collapsible assembly, and are also inconvenient to operate.

An object of the present invention is to provide an adjustable and collapsible leg assembly for supporting a stand or the like which is simple in construction and which can be adjusted in height and collapsed conveniently for stowage.

According to the present invention, an adjustable leg assembly comprises a vertical tubular support, a connector which includes a sleeve member securely provided around the vertical tubular support, the sleeve member having a plurality of radially extending lug members, a plurality of leg members each having a joint end overlapping and pivotally connected to each of the lug members, and means for adjustably locking the leg members against movement relative to the connector, the means including a plurality of positioning pin holes each of which is provided in either each of the lug members or each of the joint ends, a plurality of elongated and curved slide openings each of which is provided in either each of the lug members or each of the joint ends to be registered with each of the positioning pin holes, and a plurality of positioning pins each of which threads through each of the positioning pin holes and the curved slide openings, each of the positioning pins having a portion with an enlarged cross-section, each of the positioning pin holes having a portion with an enlarged cross-section for receiving the enlarged portion of each of the positioning pins, each of the slide openings permitting the positioning pin to slide transversely therein so as to vary the position of each of the legs relative to each of the lugs, and having a first portion narrower than that of the enlarged portion of the positioning pin and at least two second portions whose widths are large enough to receive the enlarged portion of the positioning pin, each of the positioning pin being operable to be moved axially between a first position in which the enlarged portion of each of the positioning pins is received in one of the second portions of each of the slide openings and a second position in which the enlarged portion of each of the positioning pins is outside of each of the second portions.

In one aspect of the invention, each joint end is forked and has two substantially parallel plates to sandwich each lug. The slide openings are provided in the parallel plates, and the positioning pin holes are provided in the lug members. A means for biasing the positioning pins to the first position is provided in the pin holes.

The present exemplary preferred embodiment will be described in detail with reference to the accompanying drawings, in which:

DETAILED DESCRIPTION OF THE PREFERRED EMBODIMENT

Figure 1:
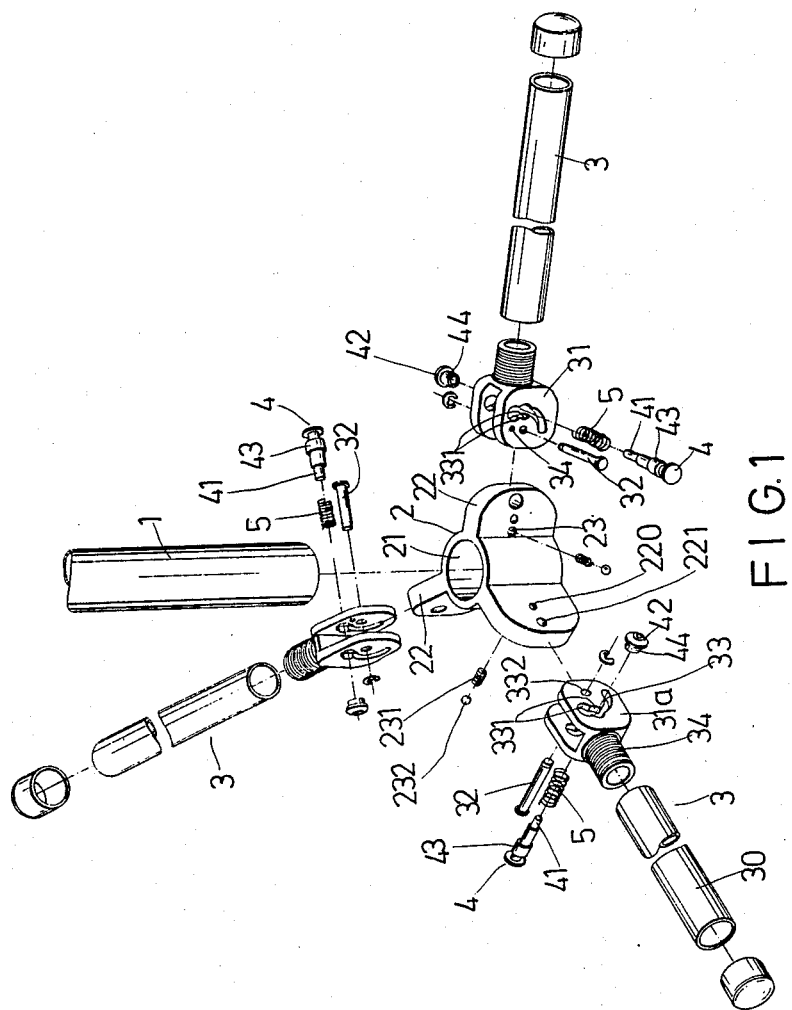
FIG. 1 is an exploded view of a leg assembly according to the present invention.
Figure 2:
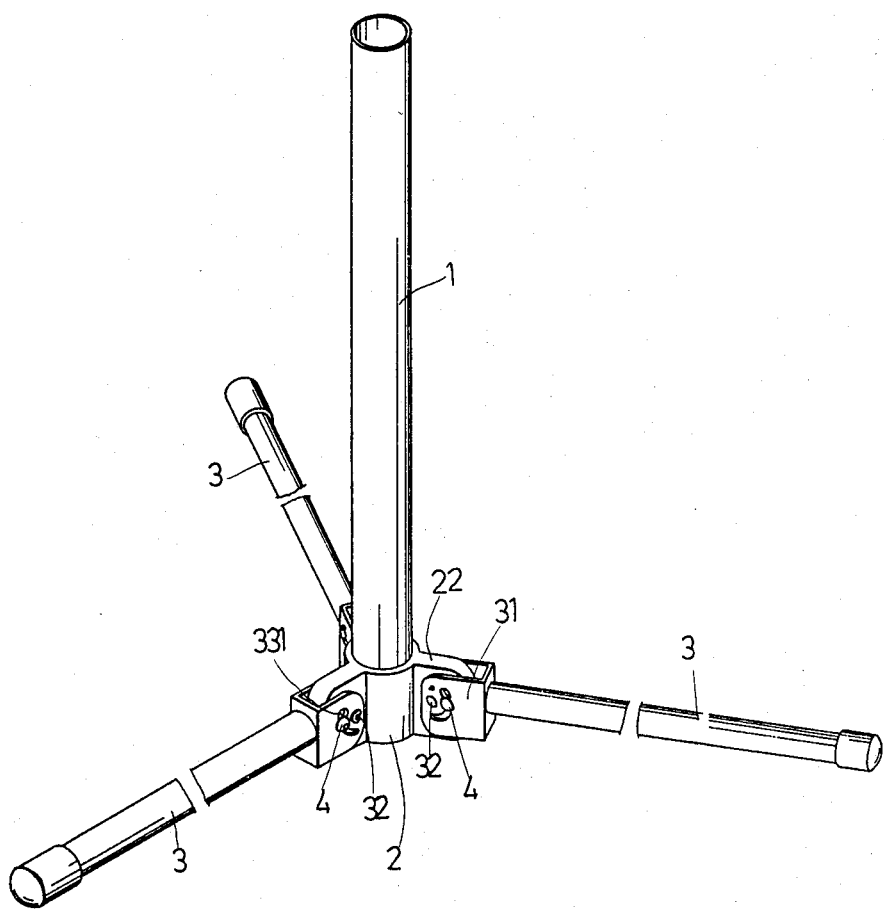
FIG. 2 is a perspective view of the leg assembly of FIG. 1.

Referring to the drawings, a leg assembly according to the present invention is shown, having a vertical tubular support 1, a connector 2 which interconnect the tubular support and a plurality of legs, specifically, three legs 3.

The connector 2 is a one piece member which includes a sleeve member 21 whose periphery is provided with a plurality of radially extending lugs, specifically, three lugs 22. Each lug is provided with a positioning hole 221 and a pivot hole 220. The positioning hole 221 has a section 222 with a large cross-section and a section 223 with a small cross-section.

Each leg 3 includes a radial tubular member 30, and a forked joint end 31 incorporating a screw member 34. The screw member 34 is inserted into and engaged with an internally threaded end of the tubular member 30, thereby connecting the forked joint end 31 to the tubular member 30. The forked joint end 31 includes two substantially parallel plates 31a which are provided with aligned slide openings 33 and aligned pivot holes 332. The forked joint ends 31 are respectively and pivotally connected to the lugs 22 by means of pins 32 which are threaded through the pivot holes 220, 332 respectively.

Figure 4:
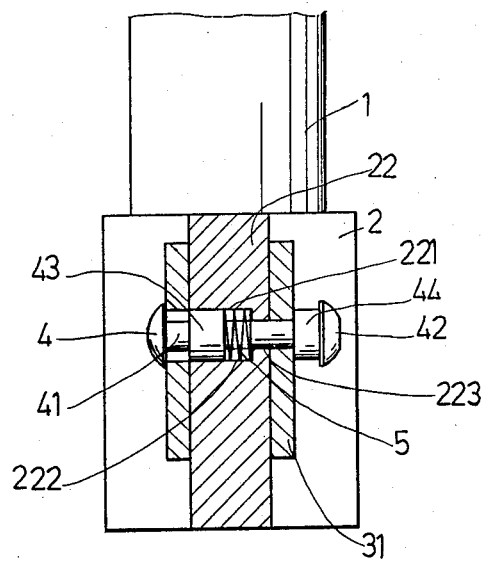
FIG. 4 is a fragmentary sectional view taken along line 4—4 of FIG. 2 wherein the positioning pin members are not locked.
Figure 3:
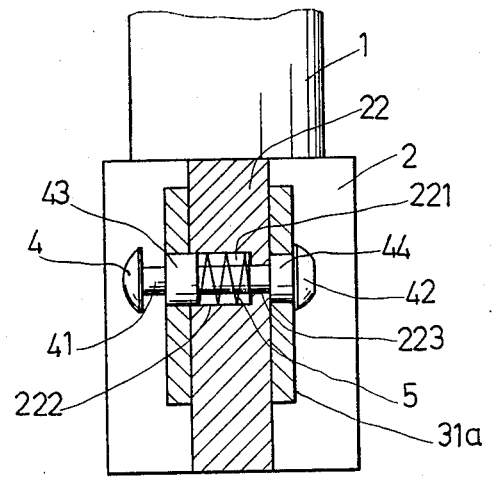
FIG. 3 is a fragmentary sectional view taken along line 3—3 of FIG. 2 wherein the positioning pin members are in a locked position.
Figure 5:
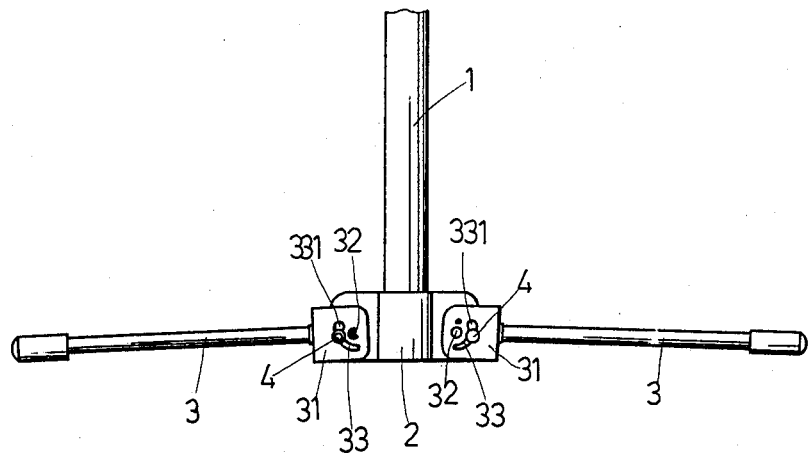
FIG. 5 is an elevation view of the leg assembly.
Figure 6:
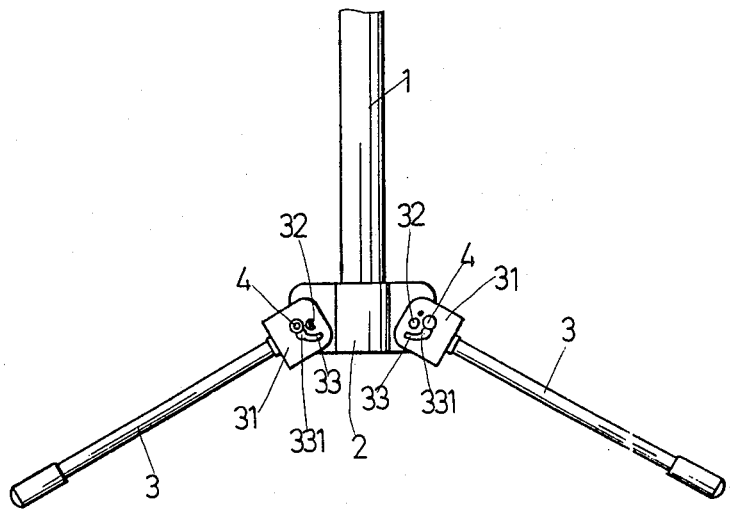
FIG. 6 is an elevation view of the leg assembly.

Each slide opening 33 is elongated and has two enlarged positioning slot portions 331. A positioning pin member 4 is threaded through slide openings 33 of each forked joint end 31 and each positioning hole 221 of each lug 22. Each positioning pin member 4 has a pin portion 41 with a flanged end and a cap portion 42 attached to the pin portion 41. There are two engaging portions 43 and 44 with an enlarged cross-section in each positioning pin member 4. The cross-section of the engaging portions 43 and 44 is greater than that of the width of the slide opening 33 and is slightly smaller than that of the positioning slot portion 331. As is shown in FIGS. 3 and 4, a spring 5 is provided in the larger section 222 of the positioning hole 221 of each lug 22 between a shoulder portion of the hole 221 and a shoulder portion of the pin member 4 so that the pin member 4 is biased in such a manner that the larger portions 43 and 44 of the pin member 4 engage with the positioning slots 331 of the forked joint end 31 and the legs 3 are immobilized relative to the connector 2. When the pin member 4 is pushed against the biasing action of the spring 5 as shown in FIG. 4, the larger portion 43 of the pin member 4 enters the larger section 222 of the positioning hole and the portion 44 of the pin member 4 moves out of the slide opening 33 of the joint end 31, thereby enabling the pin member 4 to move in the slide opening 33 and permitting each leg member 3 to move relative to the connector 2 for the adjustment of the height of the stand to which the present leg assembly is attached.

Each lug member 22 is further provided with a releaseable engaging means which includes a ball 232 and a biasing spring 231 so as to engage with the recess 34 of the forked joint end of each leg 3 when the legs 3 are turned upward or folded back to the tubular support 1 for stowing the leg assembly.

With the invention thus explained, it is apparent that various modifications and variations can be made without departing from the scope of the invention. It is therefore intended that the invention be limited only as indicated in the appended claims.

What I claim is:

1. An adjustable leg assembly comprising:
   (a) a vertical tubular support;
   (b) a connector which includes a sleeve member securely provided around said vertical tubular support, said sleeve member having a plurality of radially extending lug members, each of said lug members having a positioning pin hole;
   (c) a plurality of leg members each having a joint end, each of said joint ends being forked and having first and second substantially parallel plates, said first and second plates being pivotally connected to one of said lug members so that said first and second plates overlap said lug member, said first plate having an elongated and curved slide opening which registers with an elongated and curved slide opening in said second plate, said curved slide openings being correspondingly registered with said positioning pin hole in said lug member;
   (d) means for adjustably locking said leg members against movement relative to said connector, including a plurality of positioning pins each extending through one of said positioning pin holes and said corresponding curved slide openings;
      (i) each of said positioning pins having two portions with enlarged cross-sections;
      (ii) each of said positioning pin holes having a portion with an enlarged cross-section for receiving one of said enlarged portions of said positioning pin;
      (iii) each of said curved slide openings being formed to permit said positioning pin to slide transversely therein so as to vary the position of said leg relative to said connector, said curved slide opening having a narrow portion which is narrower than said enlarged portions of said positioning pin and at least two wide portions which are wide enough to receive said enlarged portions of said positioning pin;
      (iv) each of said positioning pins being operable to be moved axially between a first portion, in which said enlarged portions of said positioning pin can be received in said wide portions of said corresponding curved slide openings to lock the position of the leg relative to the connector, and a second position in which said enlarged portions of said positioning pin are out of said wide portions of said curved slide openings and said positioning pin can slide transversely therein.

2. The adjustable leg assembly as claimed in claim 1 further comprising means for biasing said positioning pins in said first positions whereby said leg members are locked relative to said connector.

3. The adjustable leg assembly as claimed in claim 2 wherein said biasing means includes a plurality of springs, each of said springs being positioned in said enlarged portion of one of said positioning pin holes whereby said spring is supported and protected.

4. The adjustable leg assembly as claimed in claim 1 further comprising:
   releasable engaging means for securing said legs in a substantially parallel and adjacent relationship to said vertical support member.

5. The adjustable leg assembly as claimed in claim 4 wherein:
   said engaging means includes a plurality of balls, and a plurality of biasing springs, each of said lug members having a cavity in which one of said springs is positioned to urge one of said balls outward of said cavity to be received in a recess formed in one of said parallel plates of said forked end of said leg, wherein said cavity and said recess register with one another when said legs are substantially parallel and adjacent to said vertical support member.

6. An adjustable leg assembly comprising:
   (a) a vertical tubular support;
   (b) a connector which includes a sleeve member securely provided around said vertical tubular support, said sleeve member having a plurality of radially extending lug members, each of said lug members having an elongated and curved slide opening;
   (c) a plurality of leg members each having a joint end, each of said joint ends being forked and having first and second substantially parallel plates, said first and second plates being pivotally connected to one of said lug members so that said first and second plates overlap said lug member, said first plate having a first positioning pin hole which registers with a second positioning pin hole in said second plate, said first and second positioning pin holes being correspondingly registered with said positioning pin hole in said lug member;
   (d) means for adjustably locking said leg members against movement relative to said connector, including a plurality of positioning pins each extending through one of said curved slide openings and said corresponding positioning pin holes;
      (i) each of said positioning pins having a portion with an enlarged cross-section;
      (ii) each of said first positioning pin holes having an enlarged cross-section for receiving said enlarged portion of said positioning pin;
      (iii) each of said curved slide openings being formed to permit said positioning pin to slide transversely therein so as to vary the position of said leg relative to said connector, said curved slide opening having a narrow portion which is narrower than said enlarged portion of said positioning pin and at least two wide portions which are wide enough to receive said enlarged portions of said positioning pin;
      (iv) each of said positioning pins being operable to be moved axially between a first position, in which said enlarged portion of said positioning pin can be received in one of said wide portions of said corresponding curved slide opening to lock the position of the leg relative to the connector, and a second position in which said enlarged portion of said positioning pin is out of said wide portions of said curved slide openings and said positioning pin can slide transversely therein.

7. The adjustable leg assembly as claimed in claim 6 further comprising means for biasing said positioning pins in said first positions whereby said leg members are locked relative to said connector.

8. The adjustable leg assembly as claimed in claim 7 wherein said biasing means includes a plurality of springs, each of said springs being positioned in said enlarged portion of one of said first positioning pin holes whereby said spring is supported and protected.

9. The adjustable leg assembly as claimed in claim 6 further comprising:

releasable engaging means for securing said legs in a substantially parallel and adjacent relationship to said vertical support member.

10. An adjustable leg assembly as claimed in claim 9 wherein:

said engaging means includes a plurality of balls, and a plurality of biasing springs, each of said joint ends of said leg members having a cavity in which one of said springs is positioned to urge one of said balls outward of said cavity to be received in a recess contained in one of said parallel plates of said forked end of said lug member, wherein said cavity and said recess register with one another when said legs are substantially parallel and adjacent to said vertical support member.

* * * * *